US007015790B1

(12) United States Patent
Schrott et al.

(10) Patent No.: US 7,015,790 B1
(45) Date of Patent: Mar. 21, 2006

(54) INTELLIGENT ANTITHEFT METHOD AND SYSTEM COMBINING MAGNETIC TAGS AND SMART CARDS

(75) Inventors: Alejandro Gabriel Schrott, New York, NY (US); Michael J. Steinmetz, Cary, NC (US); Robert Jacob von Gutfeld, New York, NY (US); James Peter Ward, Raleigh, NC (US)

(73) Assignee: Lenovo Pte. Ltd., (SG)

( * ) Notice: Subject to any disclaimer, the term of this patent is extended or adjusted under 35 U.S.C. 154(b) by 0 days.

(21) Appl. No.: 09/306,510

(22) Filed: May 7, 1999

(51) Int. Cl.
*G05B 19/00* (2006.01)

(52) U.S. Cl. ..................... 340/5.2; 340/10.1; 340/10.2; 340/5.25; 340/5.8; 340/5.65; 340/5.7; 340/5.9; 340/5.91; 235/380; 235/382

(58) Field of Classification Search ................. 340/5.6, 340/10.1, 5.2, 5.8, 572.1, 572.3, 5.65, 5.7, 340/5.9, 5.91; 705/5; 235/380, 382
See application file for complete search history.

(56) References Cited

U.S. PATENT DOCUMENTS

| | | | | | |
|---|---|---|---|---|---|
| 4,471,343 | A * | 9/1984 | Lemelson | .................. | 340/5.31 |
| 4,881,061 | A * | 11/1989 | Chambers | ................... | 340/568 |
| 5,739,754 | A * | 4/1998 | Schrott et al. | .............. | 340/572 |
| 5,745,036 | A * | 4/1998 | Clare | ...................... | 340/572.1 |
| 5,748,085 | A * | 5/1998 | Davis et al. | ................ | 340/572 |
| 5,874,902 | A * | 2/1999 | Heinrich et al. | ....... | 340/825.54 |
| 5,883,582 | A * | 3/1999 | Bowers et al. | ......... | 340/825.54 |
| 5,886,634 | A * | 3/1999 | Muhme | ...................... | 340/572 |
| 5,979,758 | A * | 11/1999 | Swartz et al. | ............... | 235/383 |
| 5,984,388 | A * | 11/1999 | Bacon | ........................ | 292/307 |
| 6,054,924 | A * | 4/2000 | Dames et al. | ............ | 340/572.6 |
| 6,219,439 | B1 * | 4/2001 | Burger | ....................... | 382/115 |
| 6,232,870 | B1 * | 5/2001 | Garber et al. | .............. | 340/10.1 |
| 6,297,727 | B1 * | 10/2001 | Nelson, Jr. | ................. | 340/10.1 |
| 6,393,339 | B1 * | 5/2002 | Yeadon | ...................... | 700/237 |

* cited by examiner

*Primary Examiner*—Brian Zimmerman
*Assistant Examiner*—Vernal Brown
(74) *Attorney, Agent, or Firm*—McGinn IP Law Group, PLLC

(57) ABSTRACT

A method and system for preventing theft of an object, includes an electronic article surveillance (EAS) device operatively attached to an object, a security path for detection of the EAS device, a reader operatively coupled to the security path, and a smart card for being read by the reader. The smart card contains an identification profile of an authorized user of the object.

24 Claims, 1 Drawing Sheet

INTELLIGENT ANTITHEFT METHOD AND SYSTEM COMBINING MAGNETIC TAGS AND SMART CARDS

BACKGROUND OF THE INVENTION

1. Field of the Invention

The present invention generally relates to an antitheft method and system, and more particularly to an antitheft method and system employing a magnetic tag on an item and a smart card for disabling a theft detector.

2. Description of the Related Art

Conventional systems are known which include a mechanism (and technique) for disabling an object (e.g., computer). For example, in a retail establishment, typically a system incorporating a security gate as an interrogation device is used. Typically, retail objects are affixed with a tag (e.g., magnetic tag or the like). If the object has been purchased legitimately, then the magnetic field/radio frequency field in the tag is nullified at the point of purchase. As the customer traverses through the gate, the object incorporating such a tag is interrogated, but since the tag's field has been nullified, there is no alarm.

By the same token, if a shoplifter attempts to traverse through the gate with the tag intact and operable (e.g., not nullified by the clerk or the like), then the gate will interrogate the tag affixed to the object. Since the tag has not been rendered inoperable by a tag reader held by the clerk or the like, the gate will notify an alarm (e.g., audio and/or visual). Typically, the alarm can be turned off only by the store personnel, not by the consumer, even if the consumer legitimately purchased the item.

Thus, this method is extremely inconvenient, especially in the case of a computer in a retail or office environment because the computer may become disabled and, if recovered, must be reenabled. Further, such a method would be very disruptive in an office environment where an alarm would be activated and not be able to be deactivated by a legitimate user/owner of the computer. Additionally, in such a conventional system and method, as described in, for example, U.S. Pat. No. 5,874,902, disabling and reenabling of the computer is performed, but is a very cumbersome and time-consuming process.

SUMMARY OF THE INVENTION

In view of the foregoing and other problems of the conventional method and systems, an object of the present invention is to provide a structure and method for incorporating a smart card or the like to disable an anti-theft path (gate) for legitimate purposes.

In a first aspect of the present invention, a system (and method) for preventing theft of an object, includes an electronic article surveillance (EAS) device (e.g., a 1-bit magnetic tag, as made, for example, by Sensormatic Corporation, or a 1-bit radio frequency (RF) tag, as made, for example, by Checkpoint Systems, Inc.), operatively attached to an object, a security path for detection of the EAS device, a reader operatively coupled to the gate, and a smart card for being read by the reader, the smart card containing an identification profile of an authorized user of the object.

Such a method and system allow fast, reliable tracking of personnel carrying objects (computers) into/out of an area. Further, a legitimate user can easily disable an interrogation device upon the presentation of suitable credentials (e.g., a smart card or the like).

Additionally, such a method and system are much more convenient than having the object (e.g., a computer) disabled and then having to reenable the computer upon recovery or if a mistake has occurred. That is, with the invention, the disabling function is part of the interrogation path (e.g., gate). Thus, only the gate need be disabled and then subsequently reenabled, as opposed to the object (e.g., computer) itself. This disabling/reenabling of the gate significantly simplifies the antitheft problem.

Further, the tag on the object (computer) can be a low-cost tag (e.g., a 1-bit tag or the like). Such a low-cost tag reduces the overall cost of implementing the system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
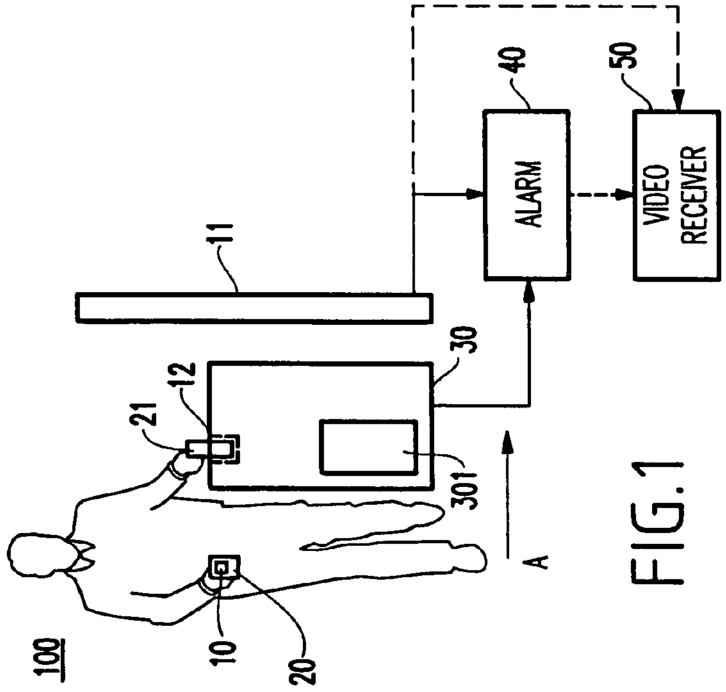
FIG. 1 is a schematic diagram of a practical system 100 according to a preferred embodiment of the present invention.

Referring now to the drawings, and more particularly to FIGS. 1–4, a system 100 and associated method for preventing theft of object(s) (e.g., a computer or the like) theft in an office or retail environment, according to the present invention, are shown.

Generally, the present invention prevents opportunity theft of objects such as computers (especially portable computers) that occurs when such objects are left unattended.

Figure 3:
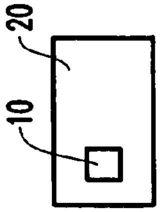
FIG. 3 illustrates an object 20 (e.g., personal computer) including an electronic article surveillance (EAS) device 10 coupled thereto.

As shown in FIGS. 1 and 3, the system 100 includes an antitheft device 10 such as an electronic article surveillance (EAS) device 10 (e.g., a "tag" or the like) operatively attached to an object 20 (e.g., hereafter for exemplary purposes a computer will be assumed to be "object" 20).

The tag 10 may be any one or more of an acousto-magnetic tag commercially available from Sensormatic Corporation (e.g., commercially available under the trade names of Ultramax® and Ultrastrip®), a low frequency tag, having a frequency in a range of about 100 to about 1000 Hz and in the form of wires and strips that produce a predetermined, rich harmonic field, and a radio frequency identification (RF) tag in the MHz range (e.g., in a narrow bandwidth at or around 8 MHz or at or around 13 MHz, as prescribed for commercial use by the FCC) similar to that produced by Checkpoint Systems, Inc. as flat resonant 1-bit disposable tags.

Further, the system 100 includes an "intelligent" security gate 11 for detection of the tag 10. Alternatively or additionally to the gate 11, other interrogation devices which could be employed include a manual scanner, or a device referred to as an "EZ Pass" or a "Flash Pass" having, for example, a ceiling-mounted transmitter or the like, and currently being used at toll booths, fuel stations, etc. for interrogating a tag (card). By simply “flashing” the pass, the interrogating device/alarm could be deactivated.

Additionally, in the vicinity of the gate or integrally built into the gate, preferably a smart card reader 12 is utilized in association with the gate 11. That is, a smart card 21 which contains an identification profile of the user also is utilized.

Figure 4:
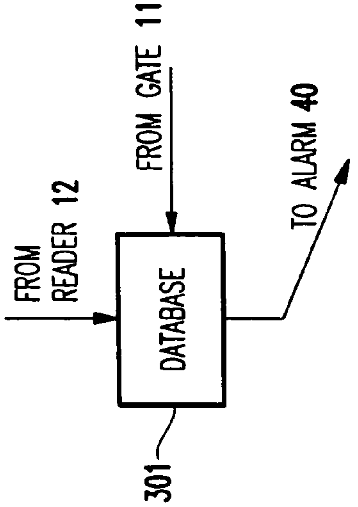
FIG. 4 illustrates an internal configuration of a computer 30 of the system 100 according to the present invention.

As shown in FIG. 1, the smart card reader 12 preferably is connected to a computer 30 containing a database 301. The computer is shown in further detail in FIG. 4. The database 301 includes information regarding the identity of the authorized user of the computer 20. As shown in FIG. 4, the database 301 receives an output from the smart card reader regarding the identity profile of the user.

The database 301 through a comparator function or the like compares user identification information from the smart card with information in the database regarding the user.

Along these lines, the computer could be part of a local area network (LAN) or be coupled (via dial-up modem or the like) to an external network such as the World-Wide-Web (WWW) for access to other information and databases.

Upon passage through the gate 11 (e.g., in the direction of Arrow A in FIG. 1), the tag 10, operatively attached to the computer 20, triggers the gate 11 to selectively notify an alarm system 40, in the standard way that gates are commonly utilized in the retail industry. The alarm 40 also may be coupled to a central guard station which also contains the video receiver 50. In an exemplary implementation, the invention preferably briefly (e.g., 5 seconds) turns off the alarm and/or opens a physical gate (allowing free passage of the user), when an authorized person exhibits his/her smart card 21 to the reader 12 located in the proximity of the gate 11. The reader 12 is connected to (or integrally formed with) computer 30 having the database 301 containing information on the personnel authorized to enter or exit the premises carrying the computer 20.

Preferably, a function of the computer 30 includes logging the time and user identity related to the passage to the gate 11. Further, the smart card reader 12 could have information regarding the computer assigned to the user traversing the gate 11.

The smart card 21 and reader 12 include direct contact and contact-less models. It is noted that, e.g., by using some zero-knowledge protocol, a smart card can be authenticated but cannot be duplicated, and one has no access to some of the information stored in the smart card if so desired, while what is stored there can be used during the usage of the smart card, to generate other information. This property is what the present inventors consider to be the characterization of a smart card, for purposes of the present application.

Accordingly, in the present disclosure, any electronic component with these properties and which has some memory and/or some processing capabilities, will be called “a smart component” or “a smart card”, even if it does not actually take any form resembling a “card”. A general reference to smart card technology and applications can be found in “Smart Cards: A Guide to Building And Managing Smart Card Applications” by Henry Dreifus and J. Thomas Monk, John Wiley & Sons, 1998.

Moreover, the card need not be “smart” but could contain a magnetic strip capable of containing a code. Further, the information in the smart card etc. could be coupled to the user’s biometrics (e.g., physical or acquired characteristics possessed solely by the user).

Figure 2:
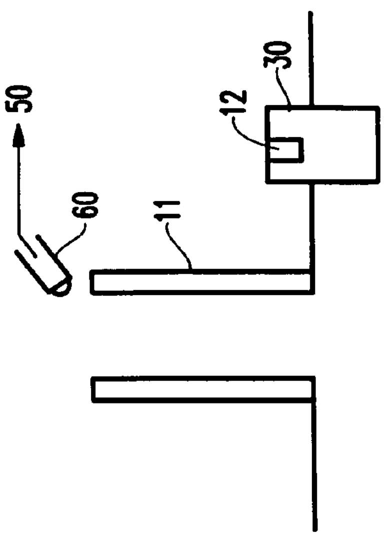
FIG. 2 illustrates a user traversing a path (e.g., gate 11) of the system and using a smart card 12 or the like according to the present invention.

As shown in FIG. 2, a camera 60 formed nearby, adjacent or integrally within the gate 11 visually records the person passing through the gate 11 when the alarm 40 rings. The image formed by the camera 60 can be provided to the above-mentioned video receiver 50 optionally coupled to a display, that may be located in a security office and possibly also on a video tape for later inspection. The video receiver is especially useful for single-bit magnetic tags, since the information carried by such tags is very limited, and thus the video receiver assists in identifying personnel.

Alternatively, a video image is captured every time the alarm 40 is actuated (e.g., sounds or visually alerts), and every time the alarm 40 is shut off. This procedure will yield a record of the number of computers taken legally as well as illegally. The camera record will also prevent tailgating by an unauthorized person when the gate 11 is legitimately shut off by the first person entering the gate 11. Alternatively, proper spacing could be ensured by an “electric eye” (photosensor) for detecting a space occurring after a user has inserted his/her smart card into the smart card reader 12, a heat sensing mechanism which detects a break in any heat-radiating form carrying an object of interest and having identified itself with a smart card 11. A break detected by the heat sensor would indicate someone tailgating the authorized user.

Thus, with the above-described invention, fast, reliable tracking of personnel carrying objects (computers) into/out of an area is provided. Further, a legitimate user can easily disable an interrogation device upon the presentation of suitable credentials (e.g., a smart card or the like).

While the invention has been described in terms of preferred embodiments, those skilled in the art will recognize that the invention can be practiced with modification within the spirit and scope of the appended claims.

The invention claimed is:

1. A system for preventing theft of an object, said system comprising:
- an electronic article surveillance (EAS) device operatively attached to an object;
- a security path for detection of said EAS device, said security path including at least one security gate;
- a reader operatively coupled to said security path and associated with one of said or least one security gate;
- a smart card for being read by said reader, said smart card containing an identification profile of an authorized user of said object; and
- a computer attached to said reader, said computer disabling a security function of said security path at said security gate if a person presenting said card at said reader is determined as being authorized to remove said object after having said smart card read by said reader; and
- an alarm operatively coupled to said security path,
- wherein upon passage through said path without first having established that said person is authorized to remove said object, said EAS device triggers the path to activate said alarm and subsequently when said smart card is read by said reader and said person is determined as being authorized to remove said object said alarm is turned off.

2. The system according to claim 1, wherein said EAS device comprises an acousto-magnetic tag.

3. The system according to claim 1, wherein said EAS device comprises a radio frequency (RF) tag.

4. The system according to claim 1, wherein said gate is for interrogating said EAS device, said gate including said reader being one of built integrally thereto and in a proximity thereof.

5. The system according to claim 1, wherein said computer contains a database including information regarding said authorized user of said object.

6. The system according to claim 1, further comprising a video receiver operatively coupled to said path, said path activating said video receiver upon interrogating said EAS device.

7. The system according to claim 1, wherein either said alarm is turned off or an authorized user is allowed free passage through said path, when said smart card is presented to said reader.

8. The system according to claim 1, further comprising a storage device, coupled to said reader, containing information on personnel authorized to enter through or exit through said path with said object.

9. The system according to claim 5, wherein said computer logs a time and user identity related to passage through said path.

10. The system according to claim 1, wherein said smart card comprises a direct contact smart card.

11. The system according to claim l, wherein said smart card comprises a contactless smart card.

12. The system according to claim 1, wherein said smart card comprises a magnetic strip containing a code.

13. A method for preventing theft of an object, said method comprising:

operatively attaching an electronic article surveillance (EAS) device to an object;

detecting said EAS device as said object traverses a security path;

operatively coupling a reader to said security path, said reader associated with a security gate in said security path;

reading, by said reader, a smart card being presented to said readers as said object traverses said security path, said smart card containing an identification profile of an authorized user of said object; and attaching a computer to said reader, said computer disabling a security function of said security path at said security gate if said smart card is determined as being associated with a person authorized to remove said object;

operatively coupling an alarm to said security path;

activating said alarm upon passage through said path without first having established that said person is authorized to remove said object; and turning off said alarm when said smart card is read by said reader and said person is determined as being authorized to remove said object.

14. The method according to claim 13, wherein said EAS device comprises m acousto-magnetic tag.

15. The method according to claim 13, wherein said EAS device comprises a radio frequency (RF) tag.

16. The method according to claim 13, wherein said security gate is for interrogating said EAS device, said gate including said reader being one of built integrally thereto and in a proximity thereof.

17. The method according to claim 13, further comprising:

providing said computer with a database including information regarding said authorized user of said object.

18. A system for preventing theft of an object, said system comprising:

an electronic article surveillance (EAS) device operatively attached to an object;

a security path for detection of said EAS device;

a reader operatively coupled to said security path, said reader located at or near a security gate of said security path;

a smart card for being read by said reader, said smart card containing an identification profile of an authorized user of said object;

a computer attached to said reader, said computer disabling a security function at said security gate if said smart card is determined to be that of a person authorized to remove said object; and operatively coupling an alarm to said security path, wherein upon passage through said path without first having established that said person is authorized to remove said object, said EAS device triggers the path to activate said alarm and subsequently when said smart card is read by said reader and said person is determined as being authorized to remove said object, said security function at said security gate is disabled by said computer, and wherein said EAS device continuously outputs a signal to said security path.

19. The system according to claim 18, wherein the identification profile is obtained independently of said signal.

20. The system according to claim 18, wherein said computer opens said security gate when said smart card is determined to include the identification profile of the authorized user of said object.

21. The system according to claim 18, wherein said computer turns off said alarm when said smart card includes the identification profile of the authorized user of said object.

22. The system according to claim 1, further comprising:

a video camera, wherein a video image is captured each time said alarm is actuated.

23. The system according to claim 1, further comprising:

a video camera, wherein a video image is captured each time said alarm is turned off.

24. The system according to claim 1, further comprising:

a video camera, wherein a video image is captured when said smart card includes the identification profile of the authorized user of said object.

* * * * *